United States Patent [19]

Stuart

[11] Patent Number: 5,311,843
[45] Date of Patent: May 17, 1994

[54] WATER HEATING APPARATUS
[75] Inventor: Kevin J. Stuart, Dallas, Tex.
[73] Assignee: Weben-Jarco, Inc., Dallas, Tex.
[21] Appl. No.: 60,861
[22] Filed: May 12, 1993
[51] Int. Cl.$^5$ ............................................. F22B 37/10
[52] U.S. Cl. ...................................... 122/248; 122/14; 122/18; 122/245; 122/367.3; 165/163
[58] Field of Search ................... 122/14, 18, 245, 248, 122/134, 367.3; 165/159, 163

[56] References Cited

U.S. PATENT DOCUMENTS

| 4,029,056 | 6/1977 | Wanson | 122/248 X |
| 4,261,299 | 4/1981 | Marran | 122/134 |
| 4,793,800 | 12/1988 | Vallett et al. | 122/18 X |
| 4,901,677 | 2/1990 | Demetri | 122/248 X |
| 4,938,204 | 7/1990 | Adams | 126/360 |

OTHER PUBLICATIONS

"A Variety of Design Factors Govern Water Heater Choices", Consulting/Specifying Engineer, Jan. 1991, pp. 48-51.

*Primary Examiner*—Edward G. Favors
*Attorney, Agent, or Firm*—Ross, Howison, Clapp & Korn

[57] ABSTRACT

A radially fired water heating apparatus (10) having a plurality of stacked segments of multiple-loop, finned coiled tubing (58) separated by inner and outer support baffles (86, 88), all contained within a cylindrical baffle (20) which cooperates with the coiled tubing (58) and support baffles (86, 88) to direct combustion by-products into an annulus (24) promoting heat transfer to a countercurrent flow of inlet air, the water being supplied to and recovered from the stacked segments of coiled tubing (58) through inlet and outlet headers (54, 56) disposed outside cylindrical baffle (20) that can be selectively modified by installing or removing baffles (90, 92) for either single-pass or multiple-pass operation.

16 Claims, 4 Drawing Sheets

WATER HEATING APPARATUS

BACKGROUND OF THE INVENTION

1. Field of the Invention

This invention relates to an improved gas-fired water heating apparatus, and more particularly, to a radially fired water heating apparatus that is adaptable for either commercial water heater or boiler use. One aspect of the invention relates to a water heating apparatus comprising a plurality of vertically stacked, multiple-turn planar coils. Another aspect of the invention relates to a water heating apparatus comprising a double walled jacket that functions as a secondary heat exchanger, transferring heat by countercurrent flow from the flue gasses to incoming combustion air. Another aspect of the invention relates to a water heating apparatus that proportions combustion air and fuel independently to control operation in response to heating demand. Still another aspect of the invention relates to a water heating apparatus that is adapted for use in a condensing environment.

2. Description of Related Art

A general review of design factors and standard references to be considered in specifying commercial water heating systems is disclosed in "A Variety Of Design Factors Govern Hot Water Heater Choices", CONSULTING/SPECIFYING ENGINEER, JANUARY 1991, p. 48-51. Such factors include, by way of example, whether the system is to utilize direct or indirect heating, the anticipated load or demand, thermal efficiency, utilization temperatures, whether the system will be used in a condensing environment, water quality, corrosion, scale, and the like.

Many direct fired, commercial water heating systems are presently available. One commercially available system, disclosed in U.S. Pat. No. 4,261,299, utilizes a horizontal combustion chamber around which water flows through a double-walled shell that is wound repeatedly around the combustion chamber with spaces between each successive winding to accommodate a countercurrent flow of exhaust gasses.

Another commercially available system, disclosed in U.S. Pat. No. 4,938,204, utilizes a dual tank design. One tank contains the primary heat exchanger in which a horizontally mounted conventional burner heats water flowing through two-pass, U-bend firetubes. Exhaust gasses that exit the primary heat exchanger at 350° F. to 400° F. are routed to a secondary heat exchanger where they are passed countercurrent to ambient makeup water to preheat the water before entering the primary exchanger. Makeup air is preheated to over 200° F. by passing it through ductwork which surrounds the exhaust gasses exiting the secondary exchanger.

Some of the newer prior art systems utilize primary exchanger sections comprising a vertically disposed, radially directed, cylindrical burner in combination with a plurality of fixed length, copper-finned tubes arranged vertically around the burner. Water flows through the tubes, which are typically connected to headers located above and below the combustion zone, either in single or double-pass configurations. In some heaters, the copper-finned tubes are intermeshed and completely surround the burner to enhance heat transfer. Difficulties have been experienced with these heaters, however, because of the limited amount of expansion or contraction that can be accommodated with the fixed tube design, and also because any condensate that may form around the horizontal fins tends to pool up on the fins, leading to corrosion and/or scaling problems and diminished thermal efficiency.

More recently, a radially fired water heating system has been introduced that utilizes horizontally disposed coils of self-baffling extruded copper tubing. This self-baffling tubing, with a generally hexagonal cross-section, is also believed likely to trap water and corrosive products on the outside of the tubing when used in a condensing environment. Most conventional designs employing coiled copper tubing use a stainless steel heat shield that is wrapped around the burner, preventing direct impingement heating on the coils. At least one design utilizes an inlet header disposed inside the circumference of the coils, making it difficult or impossible to inspect the water side of the heat exchanger section.

Another prior art condensing water heater comprises a boiler section designed as a horizontal, double-row coil of finned copper tubing surrounding a cylindrical perforated-plate flameholder in combination with an economizer designed as a single coil of finned stainless steel tubing disposed radially outward from the primary coil.

Notwithstanding the systems disclosed in the prior art, a radially fired water heater apparatus is needed that is characterized by a plurality of horizontally disposed, multiple-looped, finned coils supported and separated vertically by baffles adapted to promote efficient heat transfer to water passing through the coils; vertical inlet and outlet manifolds disposed outside the coils for easy access and inspection, the manifolds being selectively adaptable for use in either a single-pass or multiple-pass configuration; and jackets providing countercurrent heat transfer between the exhaust products exiting the primary heat exchange section and the inlet air.

SUMMARY OF THE INVENTION

A water heating apparatus is disclosed herein that provides efficient heat transfer and resists corrosion when utilized in either a condensing or noncondensing environment. According to one embodiment of the invention, a water heating apparatus is provided that comprises a plurality of vertically spaced, multiple-loop, finned coils adapted to circulate water horizontally around a radially firing cylindrical burner. According to a particularly preferred embodiment, vertically stacked, double-loop, finned coils are each preferably separated by two concentrically disposed, circumferentially extending baffles. The baffles support the coils, maintain the desired spacing between the coils, and direct the flue gasses between the fins of the coils. Because the fins each lie in a vertical plane, any condensate that forms on the coils during operation flows downward to a drain below the coils rather than pooling on or around the coils or baffles, where it could otherwise promote corrosion or the formation of scale.

According to another embodiment of the invention, a water heating apparatus is provided that comprises a plurality of water inlet and outlet manifolds that can be easily accessed and modified for either single-pass or multiple-pass operation. Both the inlet and outlet ends of each double-loop tubing coil preferably terminate outside the circumference of the coil, where they are readily accessible for inspection and/or for selectively adjusting the baffle configuration inside the manifold.

According to another preferred embodiment of the invention, a water heating system is provided that comprises vertically stacked, horizontal tubing coils, a generally cylindrical baffle surrounding the coils, and inner and outer jackets disposed radially outside the cylindrical baffle. The cylindrical baffle preferably comprises vertically spaced rows of elongate slots horizontally aligned with the tubing coils to facilitate passage of the exhaust gasses into an annulus between the cylindrical baffle and the inner jacket. Waste heat from the exhaust gasses is transferred through the wall of the inner jacket to inlet air that flows countercurrent to the exhaust gasses through the annulus between the inner and outer jackets.

The water heating system of the invention preferably further comprises a variable speed blower and a controller adapted to proportion the flow rates of inlet air and fuel to control operation of the burner in response to the water heating demand.

According to another preferred embodiment of the invention, a radially fired water heating apparatus is provided that is characterized by a plurality of stacked segments of double-loop, finned coiled tubing separated by inner and outer support baffles, all contained within a cylindrical baffle which cooperates with the coiled tubing and support baffles to direct combustion by-products into an annulus promoting heat transfer to a countercurrent flow of inlet air in an adjacent annulus, the water being supplied to and recovered from the stacked segments of coiled tubing through inlet and outlet headers disposed outside cylindrical baffle that can be selectively modified by installing or removing baffles for either single-pass or multiple-pass operation.

BRIEF DESCRIPTION OF THE DRAWINGS

The apparatus of the invention is further described and explained in relation to the following figures of the drawings wherein.

Like reference numerals are used to indicate like parts in all figures of the drawings.

DESCRIPTION OF THE PREFERRED EMBODIMENTS

Figure 1:
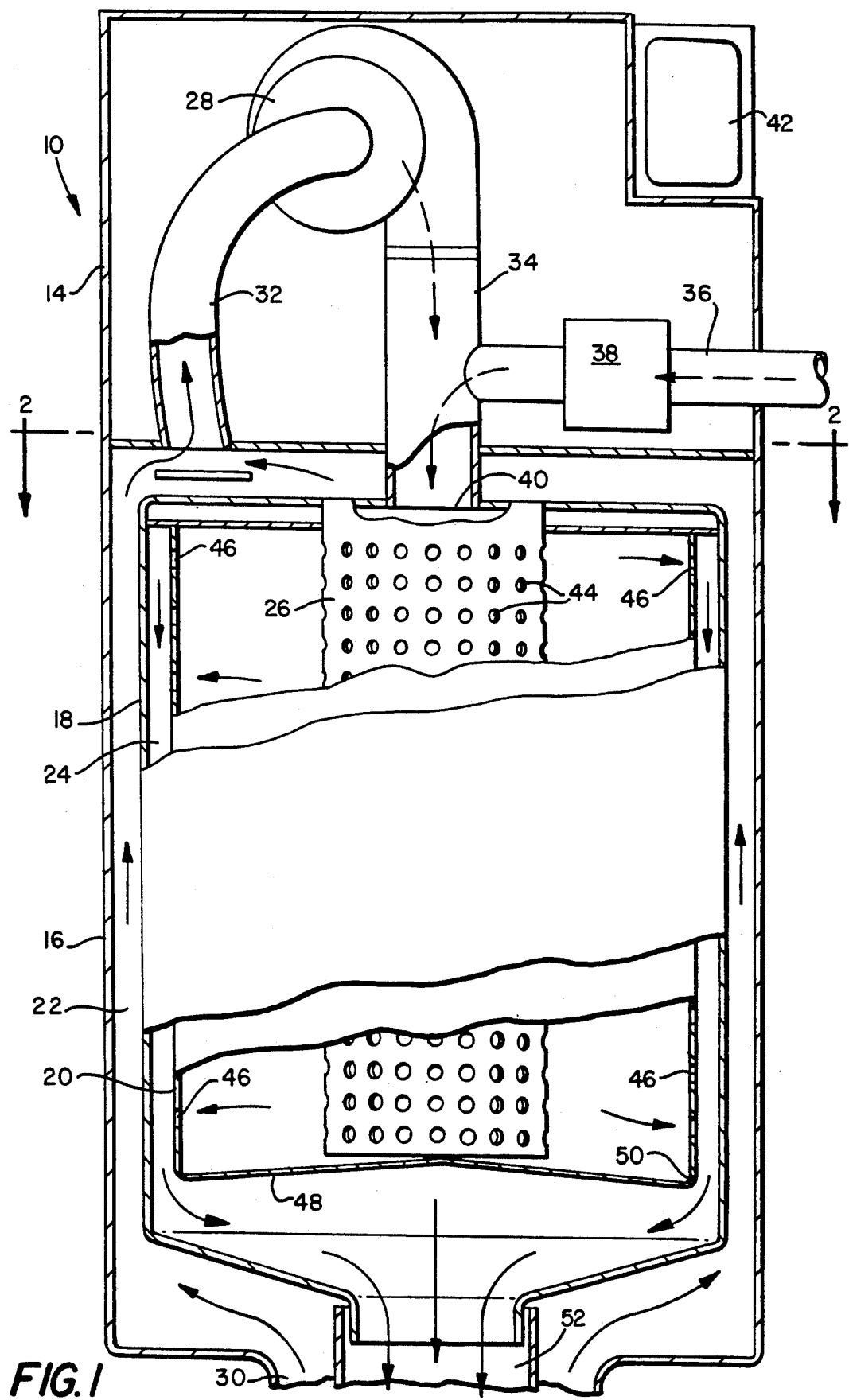
FIG. 1 is a simplified elevation view, partially broken away and partially in section, showing the general flow pattern of the inlet air, fuel and exhaust gasses into and through the water heating apparatus of the invention.

Referring to FIG. 1, water heating apparatus 10 of the invention preferably comprises upper portion 14, which serves as a cover for air blower 28 and controller 42, and a lower portion referred to herein as outer jacket 16. Inner jacket 18 and cylindrical baffle 20 cooperate with outer jacket 16 to define annulus 22 between outer jacket 16 and inner jacket 18 and annulus 24 between inner jacket 18 and cylindrical baffle 20. Outer jacket 16, inner jacket 18 and cylindrical baffle 20 are preferably concentrically aligned with centrally disposed, radially firing, cylindrical burner 26.

In the embodiment shown in FIG. 1, inlet air is drawn by blower 28 through inlet duct 30 and upward through annulus 22 into blower inlet line 32. The pressurized air is discharged from blower 28 into burner feed line 34, where it is mixed with fuel entering burner feed line 34 through fuel inlet line 36 and fuel gas control valve 38. The combined air and fuel gas are then introduced into burner 26 through burner inlet port 40. A suitable control means 42, such as a conventional, commercially available digital electronic controller, can be utilized to selectively or automatically control the speed of blower 28 and the amount of fuel entering burner feed line 34 through fuel gas control valve 38 in response to variables such as water flow rate, water outlet temperature, exhaust gas temperature, or the like.

As combustion occurs, flames are directed radially outward from cylindrical burner 26 by the flow of the air/fuel mixture through orifices 44. After flowing past tubing coils 58 (visible in FIGS. 2 and 3 but not shown in FIG. 1) disposed inside cylindrical baffle 20, the exhaust gasses containing the combustion products flow outwardly through slots 46 in cylindrical baffle 20 into annulus 24 between cylindrical baffle 20 and inner jacket 18. (In order to simplify FIG. 1, slots 46 are merely depicted as gaps in the cut edges of cylindrical baffle 20. The preferred structure and configuration of slots 46 is shown more completely, however, in FIGS. 4 and 6, which are discussed in greater detail below.) Bottom pan 48 beneath burner 26 is preferably inclined so as to direct any condensate that may form inside cylindrical baffle 20 toward condensate drain 50. Exhaust gasses flowing downward through annulus 24 transfer heat through inner jacket 18 to inlet air flowing upward through annulus 22. At the bottom of inner jacket 18, the exhaust gasses are preferably discharged from water heating apparatus 10 through duct 52.

Figure 2:
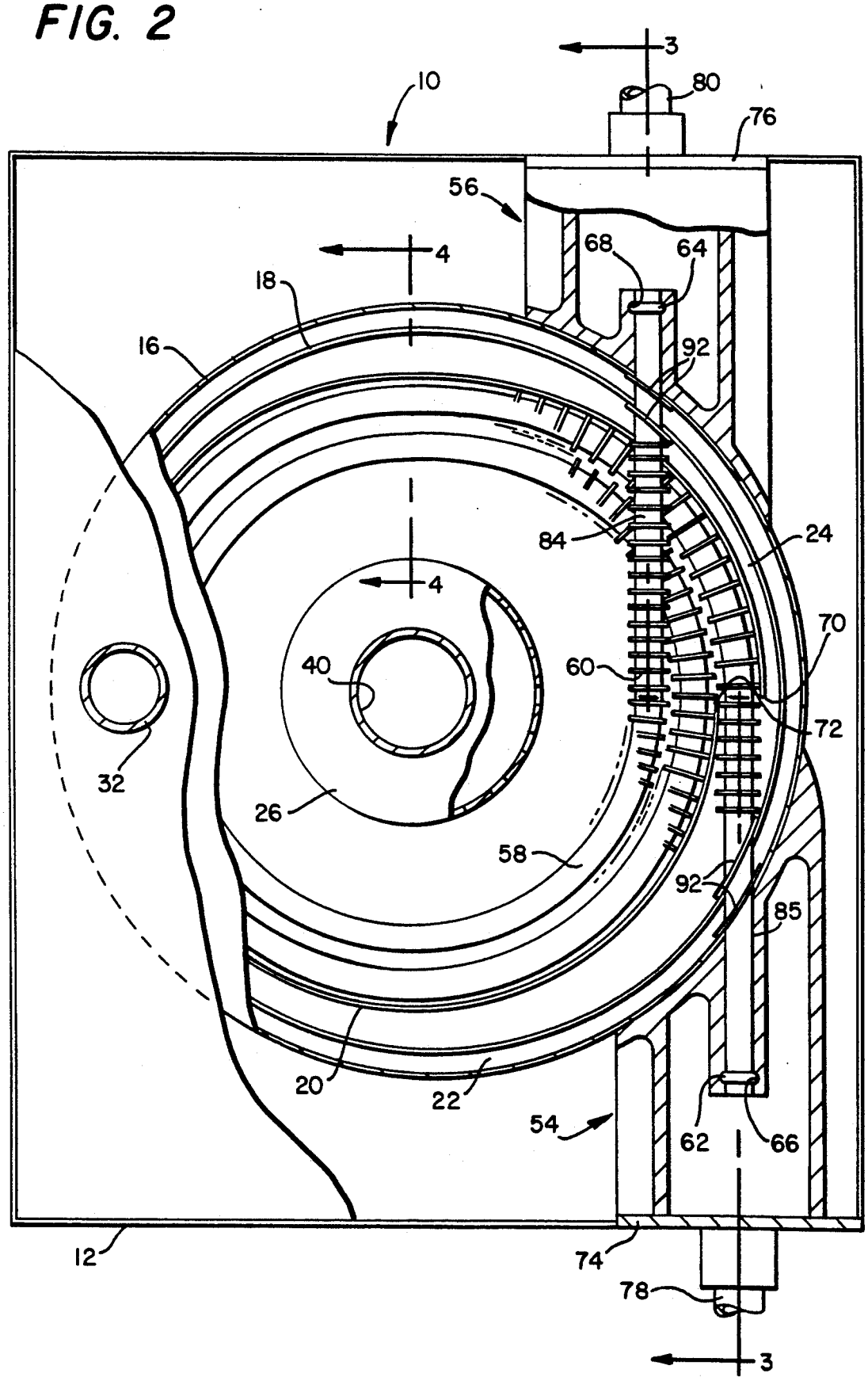
FIG. 2 is a cross-sectional view taken along line 2—2 of FIG. 1.
Figure 3:
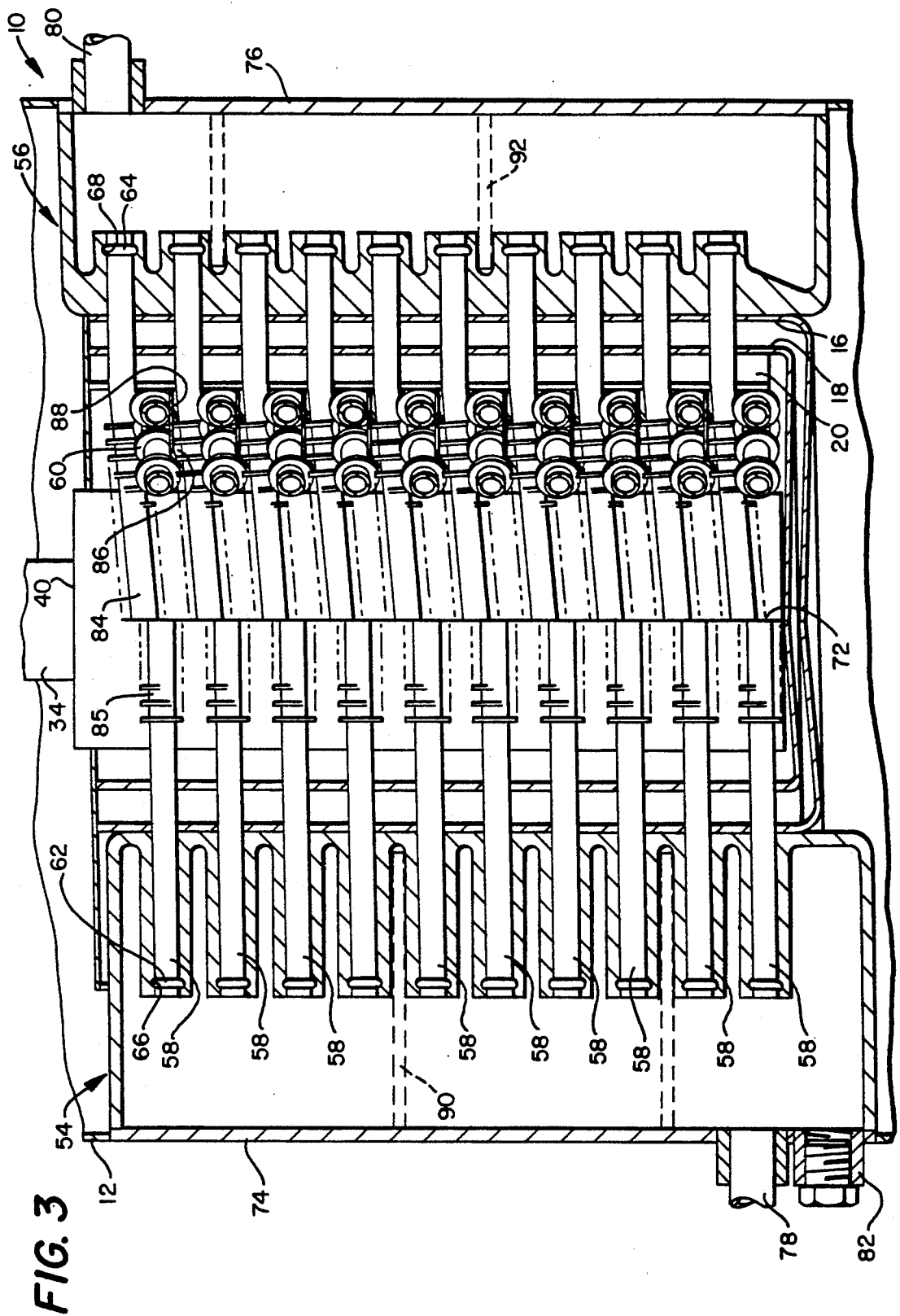
FIG. 3 is a cross-sectional detail elevational view taken along line 3—3 of FIG. 2 showing the tubing coils and water inlet and outlet headers of the water heating apparatus of the invention.

The water flow path through water heating apparatus 10 is further described and explained in relation to FIGS. 2 and 3. Referring to FIG. 2, outer jacket 16, inner jacket 18, cylindrical baffle 20 and burner 26 are shown inside outer cabinet 12. Water inlet header 54 establishes fluid communication between water inlet line 78 and the inlet end of coiled tubing 58. Similarly, water outlet header establishes fluid communication between water outlet line 80 and the outlet end of coil tubing 58. Coiled tubing 58 is preferably copper tubing having attached to it a plurality of closely spaced, relatively thin fins with a diameter larger than the outer diameter of the tubing. For ease of illustration, only a few fins are shown in FIGS. 2 and 3, and the spacing of the fins shown in FIGS. 2 and 3 is proportionally greater than the fin spacing on the actual tubing.

Because inlet header 54 and outlet header 56 are situated outside of outer jacket 16, they are easily accessed for inspection or cleaning, or for baffle modification as discussed below. According to one preferred embodiment of the invention, cover plates 74, 76 are provided to facilitate access. Coiled tubing 58 is preferably connected to inlet header 54 and outlet header 56 by hydraulically expanding the tubing into recesses 66, 68 of the respective headers, thereby creating circumferentially extending ribs 62, 64. According to a preferred embodiment of the invention, coiled tubing 58 comprises a double-loop coil in which the water is circulated inwardly toward the burner to achieve a higher discharge temperature. Although coiled tubing 58 is shown in a double-loop configuration in the drawings, it will be appreciated that other multiple-loop configurations can likewise be used within the scope of the invention. Conventional seal means 92 are desirably provided around coiled tubing 58 where inlet section 85 and outlet section 84 pass through inner and outer jackets 18, 16, respectively, to prevent cross-over of gasses flowing through annuli 22, 24.

Referring to FIG. 3, it is seen that a plurality of the double-loop segments of coiled tubing 58 are preferably stacked in substantial vertical alignment inside cylindrical baffle 20, with a pair of circumferentially extending inner and outer support baffles 86, 88, respectively, disposed under each segment. Except for the inclined discharge section 84, each segment of coiled tubing 58 preferably lies substantially in a horizontal plane. Inclined discharge section 84 enables the heated water to flow from the interior loop of coiled tubing 58, through the vertical space created between the stacked segments of coiled tubing 58, and into outlet header 56.

Figure 6:
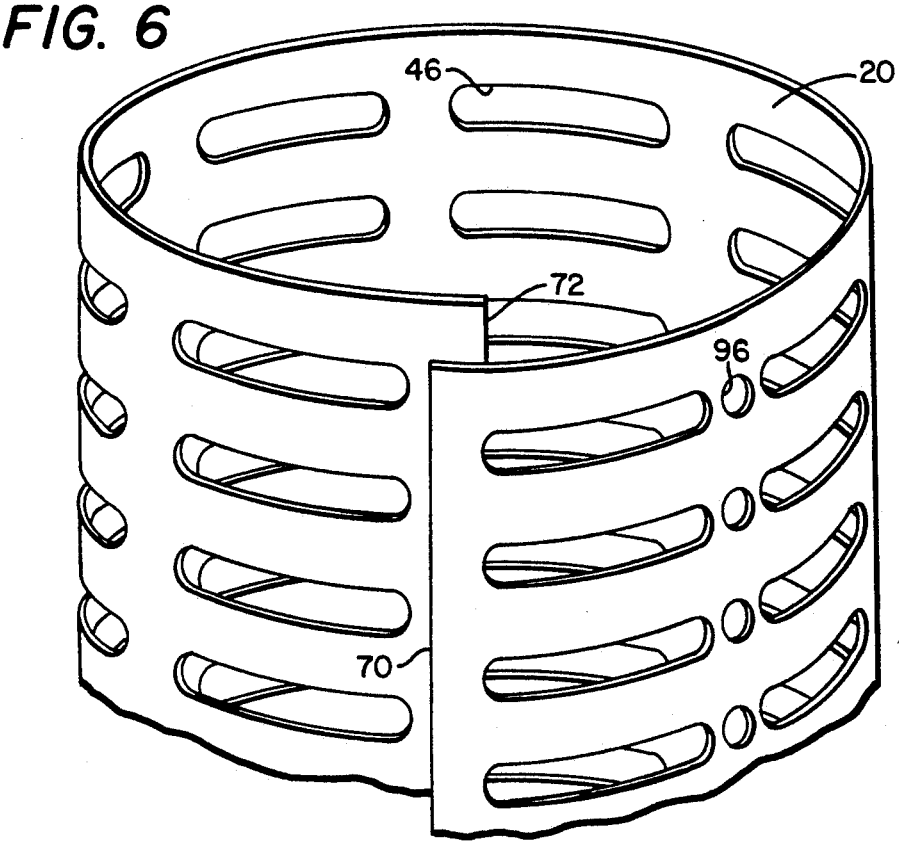
FIG. 6 is a detail perspective view of the upper portion of the generally cylindrical vertical baffle of the water heating apparatus of the invention.

Referring to FIGS. 2, 3 and 6, inlet section 84 of each segment of coiled tubing 58 preferably passes inside cylindrical baffle 20 through the gap that is present between edges 70, 72. As seen in FIGS. 2 and 6, cylindrical baffle 20 is substantially cylindrical, but possesses a surface discontinuity defined by edges 70, 72. When water heating apparatus 10 is designed and constructed in this manner, cylindrical baffle 20 easily accommodates any thermal expansion or contraction of double-loop coiled tubing 58 between inlet header 54 and outlet header 56. Cylindrical baffle 20 preferably further comprises a plurality of vertically spaced arrays of circumferentially spaced elongate slots 46, and one column of vertically spaced holes 96. Elongate slots 46 enable combustion by-products to flow outwardly from burner 26, past coiled tubing 58, and into annulus 24 between cylindrical baffle 20 and inner jacket 18.

Figure 4:
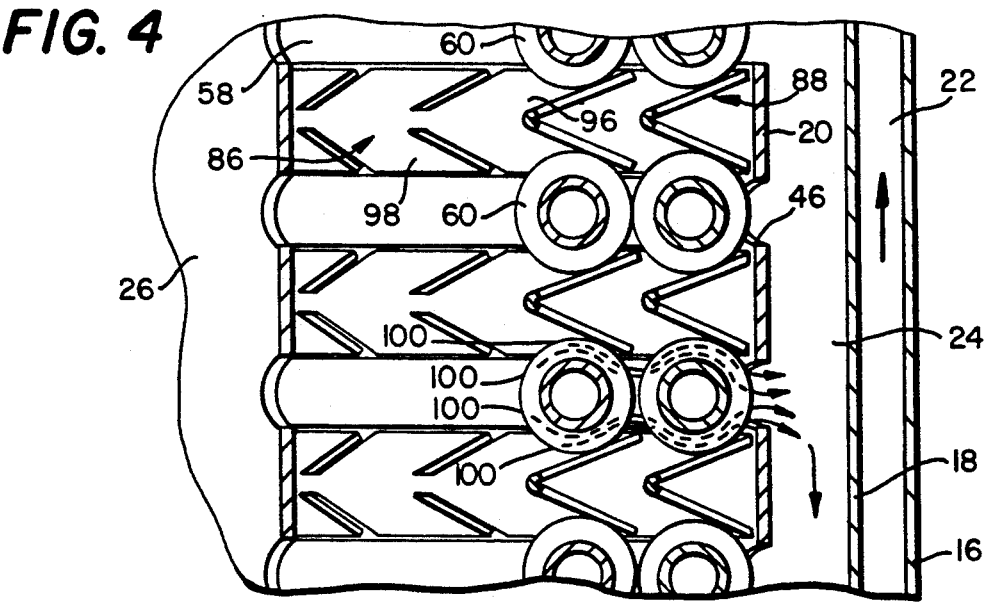
FIG. 4 is a cross-sectional detail elevational view taken along line 4—4 of FIG. 2 showing the tubing coils, tubing support baffles and cylindrical vertical baffle of the water heating apparatus of the invention, and the flow path of the exhaust gasses past the coil tubing and baffles.
Figure 5:
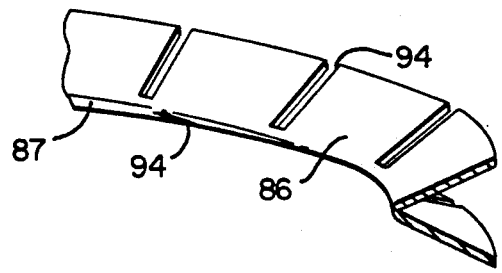
FIG. 5 is a detail perspective view of a segment of one tubing support baffle.

The structure of inner and outer support baffles 86, 88 and their relationship to coiled tubing 58 and cylindrical baffle 20 are further described and explained in relation to FIGS. 4 and 5. Referring to FIG. 5, inner support baffle 86 is preferably made from a metal strip that has been provided with a plurality of perpendicular notches 94 along each edge, folded into a V-shape along line 87, and bent into an almost-closed loop having a diameter approximating that of the respective loop of coiled tubing 58. Outer support baffle 88 is similarly made, but preferably has a slightly greater diameter corresponding to that of the outer coil of coiled tubing 58. The length of inner and outer support baffles 86, 88 is preferably such that, when bent to form a loop, the opposite ends of each baffle define a circumferential gap having a width slightly greater than the outside diameter of tubing portion of discharge section 84 of coiled tubing 58. This gap will permit the outwardly extending portion of discharge section 84 of coiled tubing 58 to extend through the vertical space otherwise occupied by support baffles 86, 88 between the stacked segments of coiled tubing 58 and through holes 96 in cylindrical baffle 20.

Referring to FIG. 4, fins 60 of the stacked segments of coiled tubing 58 rest against the upper and lower surfaces 96, 98, respectively, of both inner and outer support baffles 86, 88, thereby maintaining regular vertical spacing between the stacked segments of coiled tubing 58 and preventing fins 60 of vertically stacked segments of coiled tubing 58 from becoming intermeshed. As shown by arrows 100 in FIG. 4, inner and outer support baffles 86, 88 also help to channel radially directed gaseous combustion by-products from the burner into contact with fins 60 of coiled tubing 58 to promote heat transfer into the water flowing through the tubing. When the gaseous by-products reach cylindrical baffle 20, they are directed by outer support baffle 88 through elongate slots 46 and into annulus 24 between cylindrical baffle 20 and inner jacket 18. Any liquid that condenses out of the combustion by-products onto the surfaces of either fins 60 or baffles 20, 86, 88 flows downwardly to bottom pan 48 and condensate drain 50 as shown in FIG. 1. Gasses exiting slots 46 then travel down through annulus 24, transferring heat through inner jacket 18 to inlet air passing upward through annulus 22 between inner jacket 18 and outer jacket 16.

Referring again to FIG. 3, unless horizontal baffles 90, 92 (shown in phantom outline) are placed inside inlet and outlet headers 54, 56, respectively, water entering inlet header 54 through inlet line 78 will be distributed across the entire vertical array of coiled tubing segments 58, resulting in a single-pass configuration that is utilized to heat the maximum water flow through water heating apparatus 10. This configuration is often referred to as a "boiler" configuration.

If, on the other hand, baffles 90, 92 are actually inserted into the positions shown in phantom in FIG. 3, water entering inlet header 54 will pass sequentially through five different segments of coiled tubing 58 prior to exiting through water outlet line 80. This configuration is often referred to as a "water heater" configuration, and will typically result in a greater overall temperature increase to the water passing through coiled tubing 58 due to the lower flow rate and greater residence time.

It will be understood upon reading the disclosure that other configurations for headers 54, 56 may be similarly useful provided that the headers are situated outside the jacketed portions of the coil tubing, span about the same vertical distance as cylindrical baffle 20 between the top and bottom coils, and most preferably, are designed to permit the adjustment of baffles 90 to modify the internal flow scheme for either single-pass or multiple-pass operation. One such alternative configuration is a vertical pipe-type header in which the baffle spacing is controlled by inserting a line of alternating baffles and spacers from one end of the pipe to partition the vertical span of the header as desired.

The apparatus disclosed herein improves upon previously known devices in several respects. The combination of the multiple-loop planar coils with the inner and outer supporting baffles promotes efficient heat transfer by maintaining preferred separation and alignment. The combination of the vertically split cylindrical baffle with the inner and outer jackets provides improved heat transfer between the exhaust gasses and inlet air. The internal design of the primary heat exchange section quickly drains any condensate from the coils, thereby minimizing thermal inefficiencies and mechanical failure due to corrosion or scaling.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A water heating apparatus comprising a housing; a radially fired burner member within the housing; a plurality of vertically spaced, multiple-loop, finned coil tubing means for circulating water around the burner member; horizontally disposed, circumferentially extending flue gas baffle means for separating and supporting the coil tubing means; inlet and outlet water headers disposed radially outward of the coil tubing means and providing fluid communication therewith; and partitioned annular means disposed radially outward of the coil tubing means but within the housing for establishing countercurrent flows of flue gas and inlet air, and for conducting heat from the flue gas to the inlet air.

2. The water heating apparatus of claim 1 wherein each coil tubing means is a substantially planar, double-loop coil having a first end connected to the inlet water header and a second end connected to the outlet water header.

3. The water heating apparatus of claim 1 wherein the inlet and outlet water headers further comprise means for partitioning a flow of water between at least two adjacent multiple-loop coil tubing means.

4. The water heating apparatus of claim 3 wherein the partitioning means within the manifolds are selectively removable.

5. The water heating apparatus of claim 1 wherein the horizontally disposed flue gas baffle means comprises two concentrically disposed, circumferentially extending baffle members separating each of the vertically spaced, multiple-loop coil tubing means from any adjacent multiple-loop coil tubing means.

6. The water heating apparatus of claim 1, further comprising a vertically disposed, generally cylindrical baffle means surrounding the multiple-loop coil tubing means, the generally cylindrical baffle means further comprising vertically spaced rows of horizontally aligned means for providing fluid communication between the horizontally disposed flue gas baffle means and the annular means for establishing countercurrent flows of flue gas and inlet air.

7. The water heating apparatus of claim 1, further comprising means for determining the water heating demand and means for controlling operation of the burner in response to the water heating demand.

8. The water heating apparatus of claim 7, comprising a variable speed blower, a burner feed line, a fuel gas control valve in the burner feed line, and a digital electronic means for controlling the variable speed blower and fuel gas control valve.

9. A radially-fired water heating apparatus comprising a housing; radially-fired burner means for combusting fuel and air to produce flue gas; a plurality of vertically spaced, multiple-loop coil tubing segments disposed around the radially-fired burner means at a distance from the burner means that will facilitate impingement heating of the tubing segments; each tubing segment having at least two substantially coplanar tubing loops, an inlet end and an outlet end, both ends extending radially beyond the tubing loops, the outlet end being elevationally adjusted a sufficient distance to provide vertical clearance with respect to the tubing loops; inlet and outlet manifold means connected respectively to the inlet and outlet ends of each coil tubing segment, and means for circulating water through the manifold means and the coil tubing segments; and at least one substantially horizontal support baffle disposed between adjacent vertically spaced coil tubing segments.

10. The radially-fired water heating apparatus of claim 9, further comprising annular means within the housing but radially beyond the tubing loops for establishing and providing additional heat transfer between countercurrent flows of flue gas and inlet air.

11. The water heating apparatus of claim 9 wherein the inlet and outlet water manifold means further comprise means for partitioning the flow of water between at least two adjacent multiple-loop coil tubing segments.

12. The water heating apparatus of claim 11 wherein the partitioning means within the manifold means are selectively removable.

13. The water heating apparatus of claim 9, comprising two concentrically disposed, circumferentially extending baffle members disposed between adjacent vertically spaced coil tubing segments.

14. The water heating apparatus of claim 10, further comprising a vertically disposed, generally cylindrical baffle means surrounding the multiple-loop coil tubing segments, the generally cylindrical baffle means further comprising vertically spaced rows of horizontally aligned means for facilitating flue gas passage past the horizontal support baffle and the annular means for establishing and providing additional heat transfer between the countercurrent flows of flue gas and inlet air.

15. The water heating apparatus of claim 9, further comprising means for determining the water heating demand and means for controlling operation of the burner in response to the water heating demand.

16. The water heating apparatus of claim 9, comprising a variable speed blower, a burner feed line, a fuel gas control valve in the burner feed line, and a digital electronic means for controlling the variable speed blower and fuel gas control valve.

* * * * *